United States Patent [19]
Sauri

[11] Patent Number: 5,630,637
[45] Date of Patent: May 20, 1997

[54] PICKUP TRUCK HAVING AN ADJUSTABLE TAILGATE

[75] Inventor: Gregory M. Sauri, Garland, Tex.

[73] Assignee: Gregory Mark Sauri, Garland, Tex.

[21] Appl. No.: 663,576

[22] Filed: Jun. 13, 1996

[51] Int. Cl.$^6$ .................................................. B62D 33/08
[52] U.S. Cl. .................................. 296/56; 296/180.1
[58] Field of Search ........................ 296/50, 56, 180.1

[56] References Cited

U.S. PATENT DOCUMENTS

| | | | |
|---|---|---|---|
| 4,475,759 | 10/1984 | Wine | 296/50 X |
| 4,585,265 | 4/1986 | Mader | 296/180.1 X |
| 4,652,035 | 3/1987 | Austin, Jr. | 296/180.1 X |
| 5,039,154 | 8/1991 | Lewis | 296/52 |
| 5,236,242 | 8/1993 | Seeman | 296/180.1 |
| 5,320,397 | 6/1994 | Peterson et al. | 296/180.1 X |
| 5,352,008 | 10/1994 | Denvir | 296/56 X |
| 5,468,037 | 11/1995 | Peterson et al. | 296/180.1 X |

FOREIGN PATENT DOCUMENTS 404027678  1/1992  Japan ............................. 296/50

Primary Examiner—Joseph D. Pape
Attorney, Agent, or Firm—Gregory M. Sauri

[57] ABSTRACT

A tailgate is attached to a truck bed in a vertical position across the opening. A rear shaft and a front shaft extend across the truck bed, and a pair of chains travel around sprockets near each end of the rear shaft and the front shaft. A motor rotates the front shaft to move the chains, thus moving the tailgate upward and forward through the truck bed. The tailgate can be temporarily attached to the sides of the truck bed in a selected position, or it can be raised into a spoiler position. The tailgate may also be manually operable between positions.

13 Claims, 5 Drawing Sheets

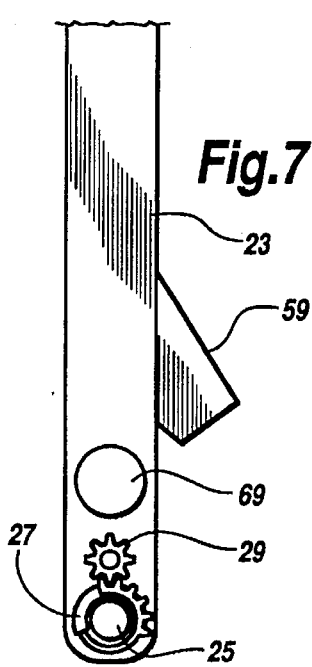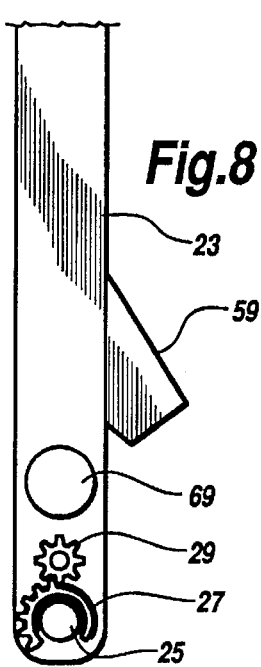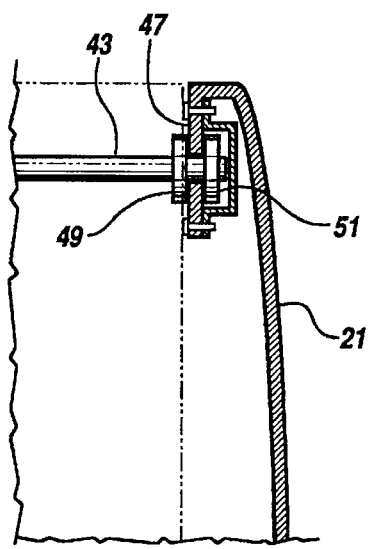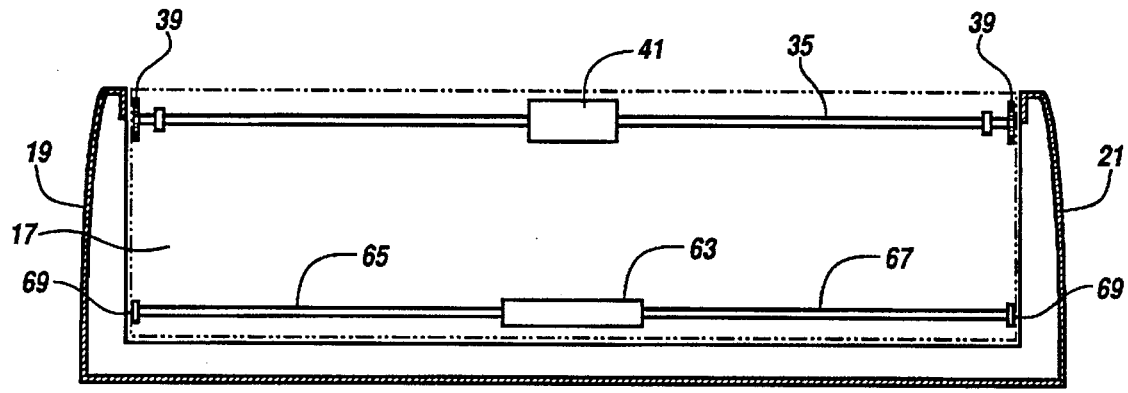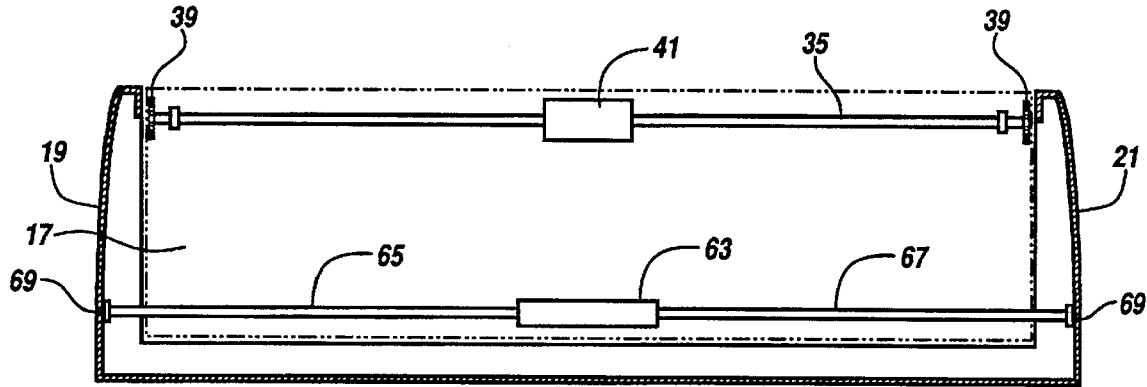

PICKUP TRUCK HAVING AN ADJUSTABLE TAILGATE

This application claims the benefit of U.S. Provisional Application No. 60/011,165 filed on Feb. 5, 1996.

BACKGROUND OF THE INVENTION

1. Field of the Invention

This invention relates in general to pickup trucks. In particular, the invention relates to pickup trucks having tailgates that can be adjusted to various useful positions.

2. Description of Related Art

Typical pickup trucks have a truck bed, defined by a floor, a front, and two sides, leaving a rectangular opening at the rear. The rear of the truck bed is normally closed by a tailgate. Most tailgates can be opened downward to a horizontal position, or removed from the truck completely. Thus, the typical tailgate has only two possible positions, open and closed.

Unfortunately, when the tailgate is in the closed position, wind resistent is a serious problem, causing a severe reduction in gas mileage. Therefore, many pickup truck drivers remove the tailgate or drive around with the tailgate in the open position. In the open position the tailgate is horizontal and extends rearward beyond the rear bumper of the truck, thus presenting a dangerous obstacle to vehicles behind the pickup truck.

There are several reasons why a more adjustable tailgate would be desirable. If a tailgate can be moved forward from the rear of the truck bed, the size of the truck bed can be reduced. This might be useful when the cargo to be carried in the truck bed is smaller than the full sized truck bed. Also, if the tailgate can be pivoted up into a spoiler position, the tailgate might become an asset to the wind resistance of the truck, rather than a detriment.

SUMMARY OF THE INVENTION

The general object of the invention is to provide a pickup truck with an adjustable tailgate that can be adjusted to reduce the size of the truck bed or to provide the truck with a wind spoiler. In general, this object is accomplished by a special tailgate assembly attached to the truck bed. The tailgate assembly includes means for disconnecting the tailgate from the truck bed. A rear shaft and a front shaft extend across the truck bed and have a sprocket near each end of each shaft. A pair of chains travel around the sprockets, and are connected to the tailgate. A motor rotates the front shaft to move the chains, thus moving the tailgate upward and forward through the truck bed. The tailgate assembly also includes means for temporarily attaching the tailgate to the sides of the truck bed in a selected position.

The above, as well as additional objects, features, and advantages of the invention will become apparent in the following detailed description.

BRIEF DESCRIPTION OF THE DRAWINGS

FIG. 7 is a closeup right side elevation of the lower part of the tailgate, when the clasp is closed on the ball hinge.

FIG. 8 is a closeup right side elevation of the lower part of the tailgate, when the clasp is open.

FIG. 9 is a closeup view of the right end of the horizontal shaft through the tailgate.

FIG. 10 is a rear cross-section of the pickup truck, showing the means for temporarily attaching the tailgate to the sides of the truck bed in a selected position, with the piston rods in the released position.

FIG. 11 is a rear crosssection of the pickup truck, with the piston rods in the attached position.

DESCRIPTION OF THE PREFERRED EMBODIMENT

Figure 1:
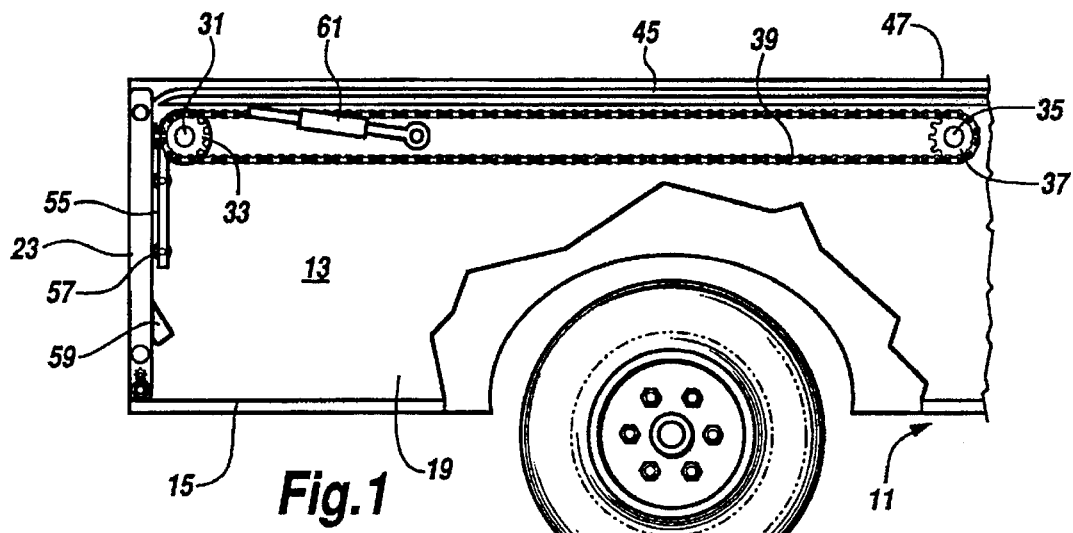
FIG. 1 is a right side elevation of the pickup truck of the invention, with portions of the truck cut away for clarity.

As shown in FIGS. 1–6, the pickup truck 11 of the invention has a truck bed 13, defined by a floor 15, a front 17, and two sides 19 and 21. The truck bed 13 thus has a rectangular opening at the rear end of the bed 13. This opening is closed by a tailgate 23, when the tailgate 23 is in the closed position, as shown in FIG. 1.

The tailgate 23 is attached to the truck bed 13 in two ways. First, the upper portion of the tailgate 23 is attached to the sides 19 and 21 with a typical latch, as is found in a typical prior art pickup truck.

Secondly, the lower portion of the tailgate 23 is attached to a pair of ball hinges 25, as shown in FIGS. 7 and 8. The ball hinges 25 extend inward from each side 19 and 21 of the truck bed 13. A clasp 27 on the tailgate 23 encircles each ball hinge 25. A gear 29 can be rotated, either manually or by a motor, to move the clasp 27 from the closed position, shown in FIG. 7, to the open position, shown in FIG. 8. The clasp 27 is similar to the clasps that are commonly used on small necklaces.

A rear shaft 31 extends across the truck bed 13 near the rear of the bed 13, and has a sprocket 33 near each end. Similarly, a front shaft 35 extends across the truck bed 13 near the front of the bed 13. The front shaft 35 also has a sprocket 37 near each end. A pair of chains 39 travel around the sprockets 33 and 37 on the rear and front shafts 31 and 35.

A motor 41, shown in FIGS. 10 and 11, rotates the front shaft 35 to move the chains 39. The chains 39 are connected to the tailgate 23, so as the chains 39 move, the tailgate 23 is moved upward and forward. The motor 41 can be reversed to move the chains 39 backward, and to return the tailgate 23 to its closed position, shown in FIG. 1.

As shown in FIG. 9, a horizontal shaft 43 passes through the upper portion of the tailgate 23. Each end of the horizontal shaft 43 extends past the side of the tailgate 23, into a groove 45 in the inside overlap lip 47. A pair of disks 49 and 51 form a spool on each end of the horizontal shaft 43. The disks 49 and 51 are located on opposite sides of the overlap lip 47 as the shaft 43 rolls along the groove 45. A support bracket is attached to the overlap lip 47 to supplement the strength of the overlap lip 47.

Figure 2:
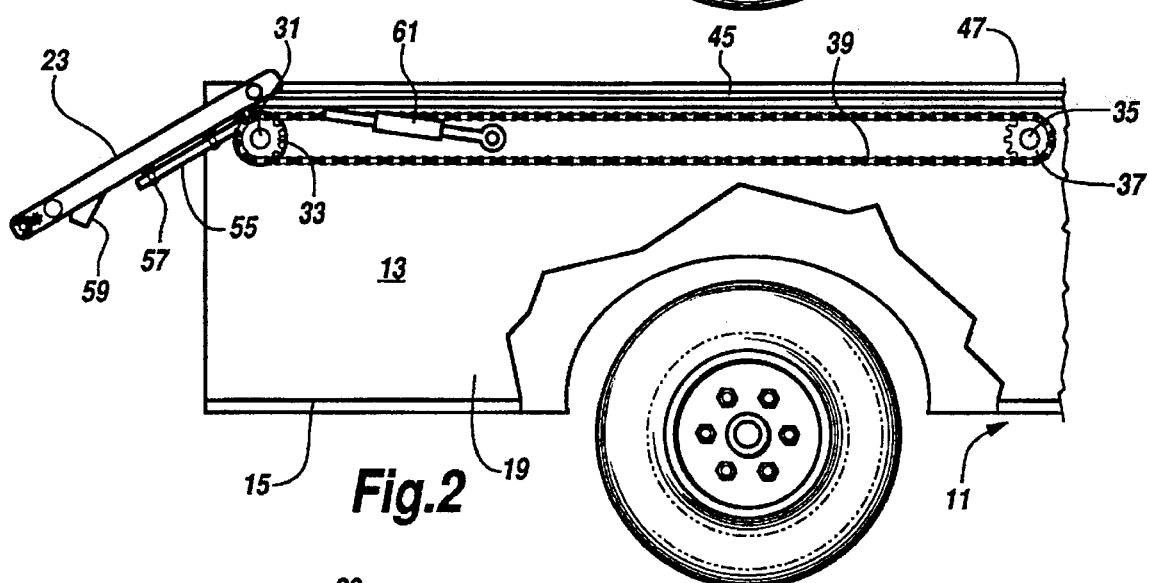
FIG. 2 is a right side elevation of the pickup truck, with the tailgate partially raised.
Figure 3:
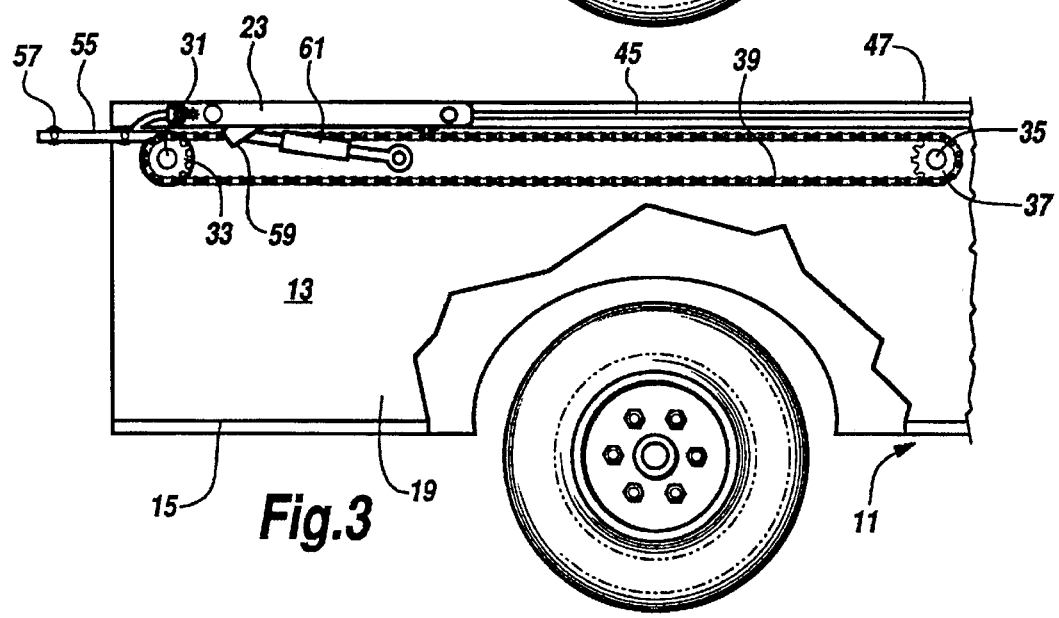
FIG. 3 is a right side elevation of the pickup truck, with the tailgate fully raised to the horizontal position.

As the tailgate 23 is being pulled upward and forward, a ratchet 55 causes the tailgate 23 to pivot from a vertical position to a horizontal position, as shown in FIGS. 1–3. The ratchet 55 has rollers 57 to facilitate the movement of the tailgate 23 across the ratchet 55. The ratchet 55 is attached to the rear shaft 31, and is pivoted by the shaft 31 as it rotates. The ratchet 55 pivots up to a horizontal position and then stops.

Figure 4:
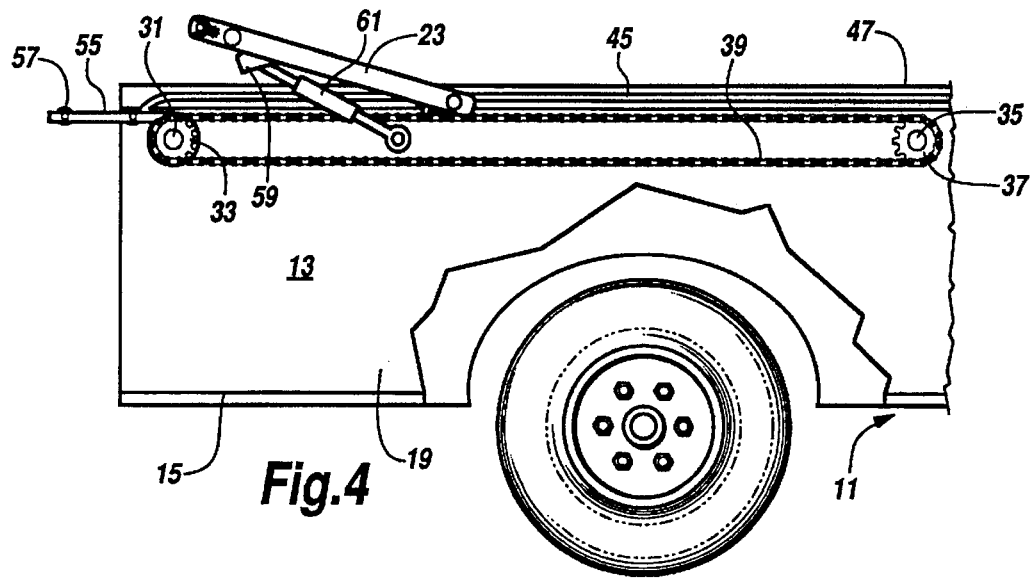
FIG. 4 is a right side elevation of the pickup truck, with the tailgate raised into the spoiler position.

The tailgate 23 includes a pocket 59 on the inner surface of the tailgate 23. As the tailgate 23 is pulled forward, the pocket 57 contacts the end of a rod 61. The rod 61 is pivotably connected to one side 19 of the truck bed 13. As the tailgate 23 is pulled further forward, the rod 61 pivots and raises the rear, or lower, part of the tailgate 23 into a spoiler position, as shown in FIG. 4. The length of the rod 61 is adjustable, so the angle of the spoiler position can be adjusted as desired.

The tailgate 23 may, if desired, have several cylindrical corners attached to the tailgate 23 to assist in controlling the wind as the wind passes over the tailgate 23. Each corner would inclose an adjustable wind control tongue.

The tailgate 23 may also have a backup detection sensor for warning the driver that the truck 11 is about to back into an obstacle. The sensor could be mounted within the tailgate 23 and aimed rearward.

Figure 5:
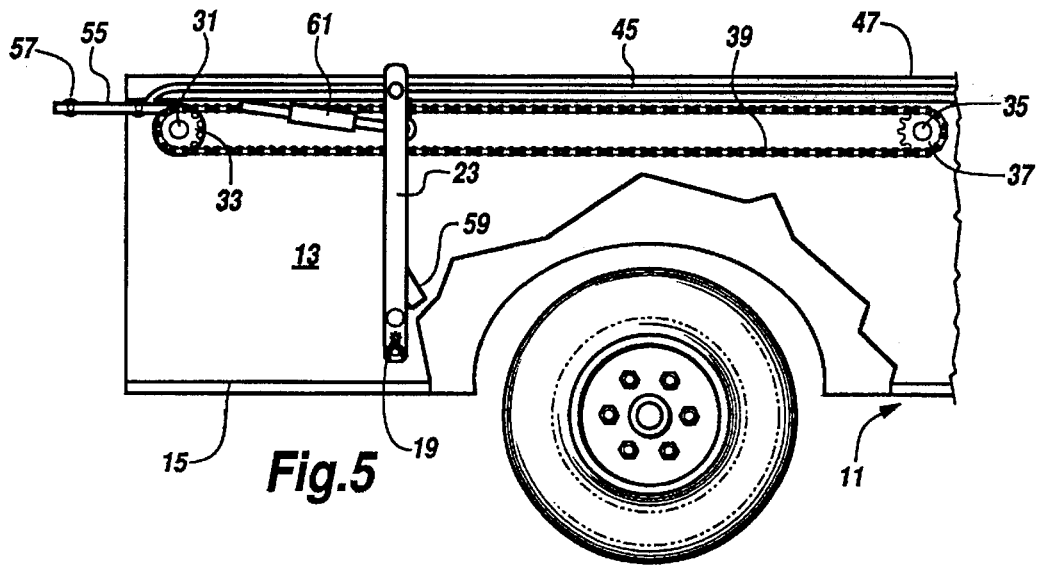
FIG. 5 is a right side elevation of the pickup truck, with the tailgate lowered into a vertical position forward of the rear of the truck bed.
Figure 6:
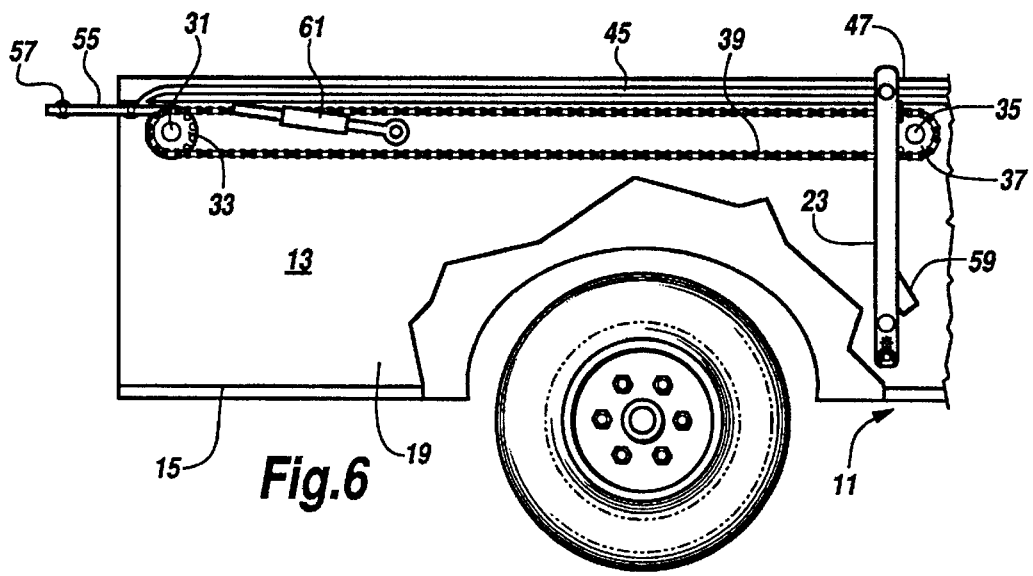
FIG. 6 is a right side elevation of the pickup truck, with the tailgate in the most forward vertical position.

In other circumstances, the rod 61 can be removed from the pocket 57, and the tailgate 23 can be pulled even further forward, as shown in FIGS. 5 and 6. The tailgate 23 can then be pivoted downward into a vertical position. The tailgate 23 is then temporarily attached to the sides 19 and 21 of the truck bed 13 in a selected position. As shown in FIGS. 10 and 11, this is accomplished with a cylinder and piston assembly 63, having a pair of pistons 65 and 67, movable between a released position, shown in FIG. 10, and an attached position, shown in FIG. 11. A padded contact 69 is attached to the end of each piston 65 and 67, and the contacts 69 on the ends of the pistons 65 and 67 contact the sides 19 and 21 of the truck bed 13. This holds the lower end of the tailgate 23 in place, thus defining a new truck bed 13 of a smaller size.

FIGS. 12–16 illustrate a second embodiment of the invention. This embodiment is manually operated, rather than electrical.

In this embodiment, there are a plurality of holes 71 along the length of the inside overlap lip 73 on each side of the pickup truck 75. There are also a plurality of smaller holes 77 along the length of the inside overlap lip 73.

The upper end 79 of the tailgate 81 has a spring loaded attachment pin 83 on each side, to engage a selected one of the holes 71 in the inside overlap lip 73. The pin 83 can be pulled in and out to engage and disengage the hole 71 in the inside overlap lip 73.

Figure 12:
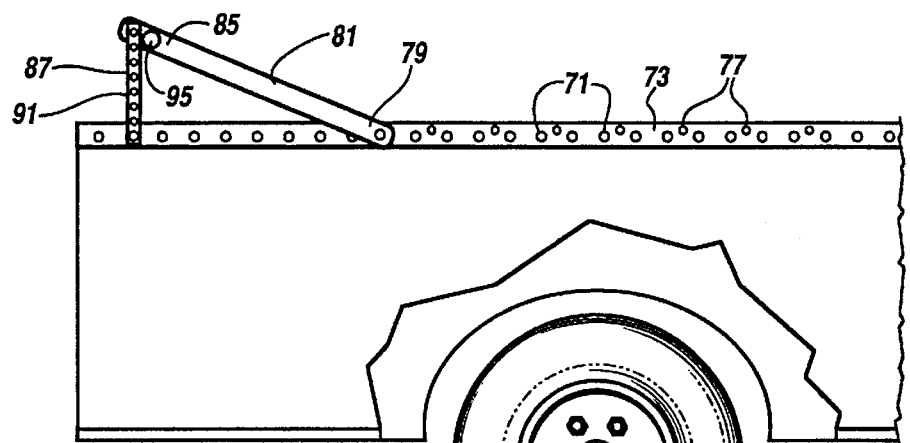
FIG. 12 is a right side elevation of a second embodiment of the pickup truck of the invention, with the tailgate shown in the spoiler position.
Figure 13:
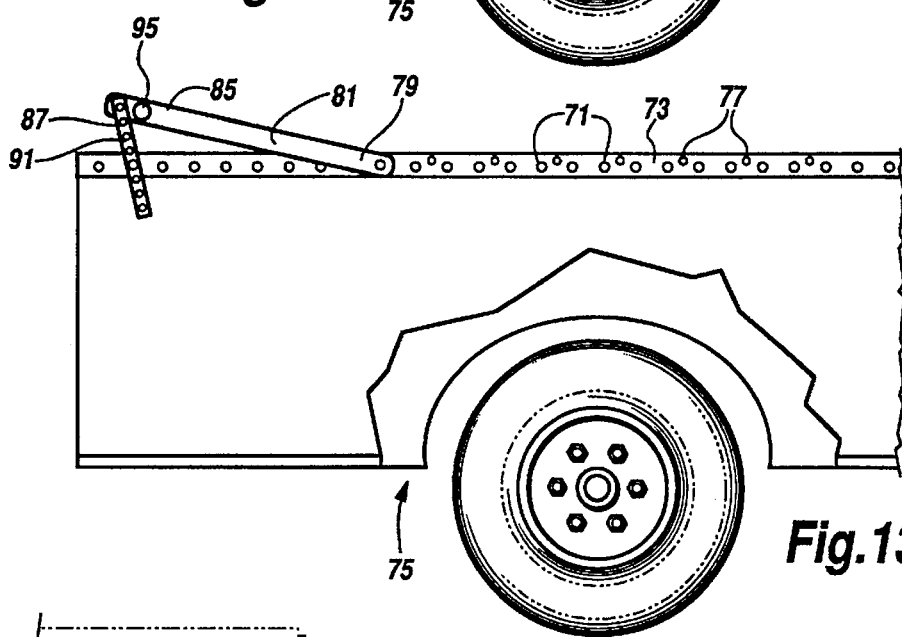
FIG. 13 is a right side elevation of the second embodiment of the pickup truck of the invention, with the tailgate shown in the lower spoiler position.
Figure 14:
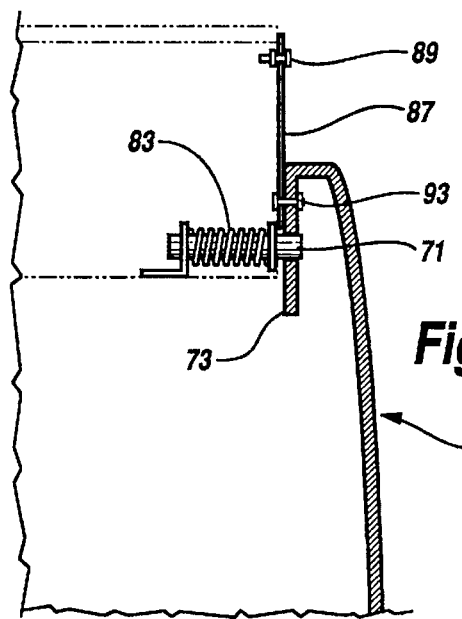
FIG. 14 is a cross sectional view of the second embodiment showing the connection of the tailgate to the inside overlap lip.

The lower end 85 of the tailgate 81 can be attached to a bracket 87, as shown in FIGS. 12–14. One end of the bracket 87 is connected to the lower end 85 of the tailgate 81 with a small pin 89 that passes through the bracket 87 into the tailgate 81. The bracket 87 has a plurality of holes 91, and a selected one of these holes 91 can be secured to one of the smaller holes 77 along the length of the inside overlap lip 73 using a small pin 93, as shown in FIG. 14. By selecting different holes 91 in the bracket 87, the tailgate 81 can be positioned high, as shown in FIG. 12, or lower, as shown in FIG. 13.

Figure 15:
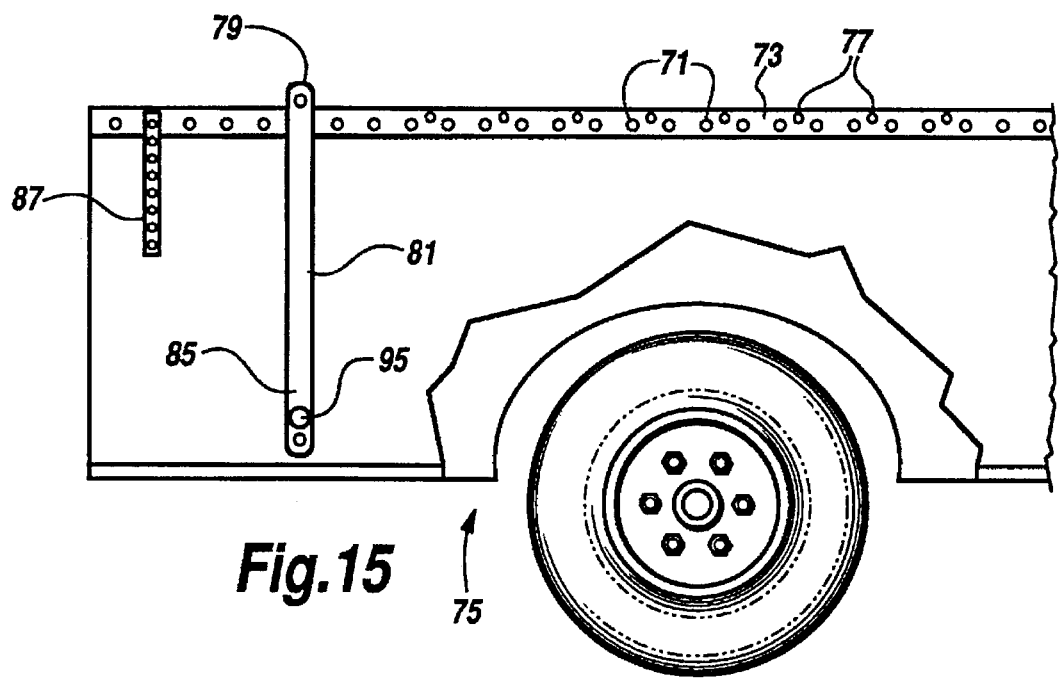
FIG. 15 is a right side elevation of the second embodiment of the pickup truck of the invention, with the tailgate shown in the cargo position.
Figure 16:
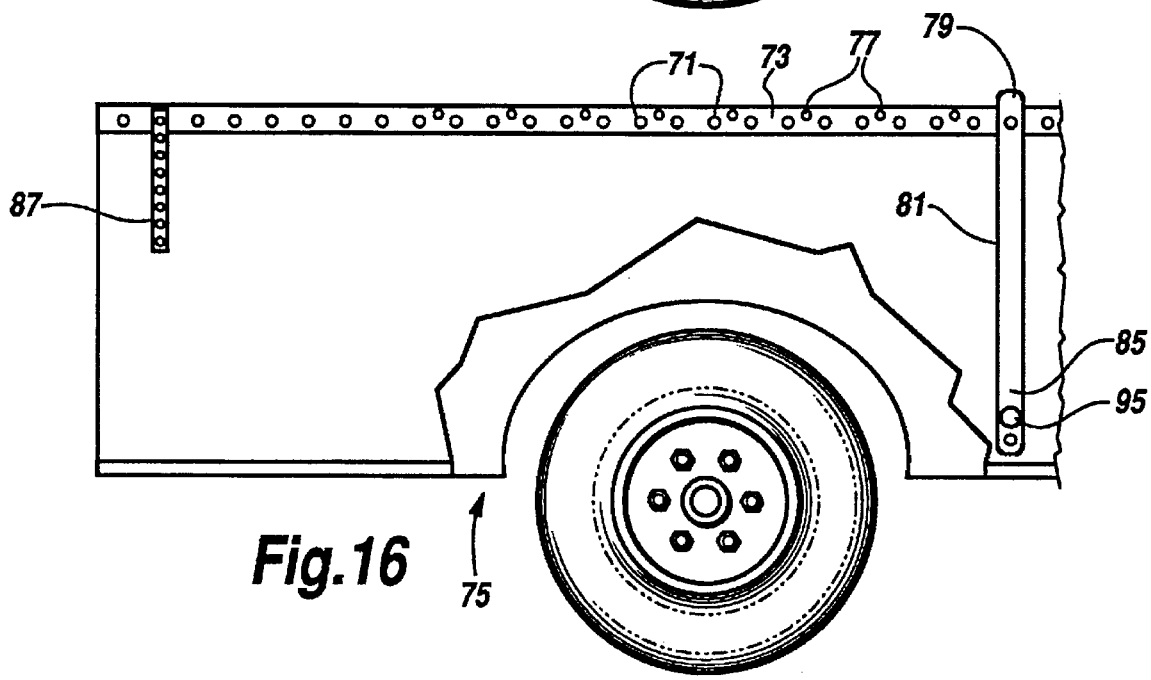
FIG. 16 is a right side elevation of the second embodiment of the pickup truck of the invention, with the tailgate shown in the storage position.

The tailgate 81 can also be placed in a vertical position, as shown in FIGS. 15 and 16. The upper end 79 of the tailgate 81 can be attached to any of the holes 71 in the inside overlap lip 73. In FIG. 15, the tailgate 81 is in an intermediate position that shortens the effective length of the cargo hold. In FIG. 16, the tailgate 81 is fully forward for storage.

When the tailgate 81 is in a vertical position, the lower end 85 of the tailgate 81 must be secured to the sides of the truck bed. A padded contact 95 is attached to the end of a pair of pistons, and the contacts 95 on the ends of the pistons contact the sides of the truck bed. This holds the lower end of the tailgate 81 in place, thus defining a new truck bed of a smaller size. The pistons are similar to the pistons shown in the first embodiment of the invention, but can be opened and closed in any of several well known manual methods.

The pickup truck of the invention has several advantages over the prior art. The tailgate of the invention can be easily released from its closed position, and raised to a spoiler position, or moved to a new closed position, closer to the front of the truck bed. Thus, the tailgate can be used to improve gas milage, or can be used to reduce the size of the truck bed to a desired size.

The invention has been described in only two embodiments. It should be apparent to those skilled in the art that the invention is not so limited, but is susceptible to various changes and modifications without departing from the spirit of the invention.

I claim:

1. A pickup truck, comprising:
   a truck bed, defined by a floor, a front, and two sides, leaving a rectangular opening at one end;
   a tailgate;
   a rear shaft extending across the truck bed and having a sprocket near each end of the rear shaft;
   a front shaft extending across the truck bed and having a sprocket near the end of each end of the front shaft;
   a pair of chains, each chain traveling around the sprockets near each end of the rear shaft and the front shaft, and connected to the tailgate;
   a motor for rotating the front shaft to move the chains, thus moving the tailgate upward and forward through the truck bed; and
   means for temporarily attaching the tailgate to the sides of the truck bed in a selected position.

2. A pickup truck as recited in claim 1, wherein the means for temporarily attaching the tailgate to the sides of the truck bed in a selected position is a cylinder and piston assembly, having a pair of pistons movable between a released position and an attached position in which the ends of the pistons contact the sides of the truck bed.

3. A pickup truck as recited in claim 1, wherein the means for temporarily attaching the tailgate from the truck bed is a pair of clasps that secure and release a pair of support posts located on the sides of the truck bed.

4. A pickup truck as recited in claim 1, further comprising:
   a horizontal shaft passing through the tailgate so that each end of the horizontal shaft extends past a side of the tailgate into a groove in an inside overlap lip in a side of the truck bed;

a support bracket attached to each side of the truck bed to support the inside overlap lips; and a pair of disks located on each end of the horizontal shaft forming a spool for rolling along each of the grooves in the inside overlap lips.

5. A pickup truck as recited in claim 1, further comprising means for pivoting the tailgate into a horizontal position as the chains pull the tailgate forward.

6. A pickup truck as recited in claim 5, wherein the means for pivoting the tailgate is a ratchet attached to the rear shaft.

7. A pickup truck as recited in claim 5, further comprising means for pushing the tailgate upward into a spoiler position as the chains pull the tailgate forward.

8. A pickup truck as recited in claim 7, wherein the means for pushing the tailgate upward into a spoiler position is a rod, pivotably connected to one side of the truck bed, and having an end that inserts into a pocket on the tailgate.

9. A pickup truck as recited in claim 8, wherein the rod is extendable to adjust the spoiler position of the tailgate.

10. A pickup truck, comprising:

a truck bed, defined by a floor, a front, and two sides, leaving a rectangular opening at one end;

a tailgate, having an upper end and a lower end;

means for attaching the upper end of the tailgate to the sides of the truck bed at a selected position along the length of the truck bed;

a bracket attached to the sides of the truck bed at a selected position along the length of the truck bed; and means for attaching the lower end of the tailgate to the bracket to hold the lower end of the tailgate in a spoiler position.

11. A pickup truck as recited in claim 10, wherein the lower end of the tailgate can be attached to the bracket in any of several positions.

12. A pickup truck, comprising:

a truck bed, defined by a floor, a front, and two sides, leaving a rectangular opening at one end;

a tailgate, having an upper end and a lower end;

means for attaching the upper end of the tailgate to the sides of the truck bed at a selected position along the length of the truck bed; and means for attaching the lower end of the tailgate to the sides of the truck bed at the same selected position along the length of the truck bed as the upper end to hold the lower end of the tailgate in a storage position whereby the tailgate has a vertical orientation in the storage position.

13. A pickup truck as recited in claim 1, further comprising automatically releasable hinge means for selectively connecting the tailgate to the rectangular opening at one end thereof.

* * * * *